(12) United States Patent
Park et al.

(10) Patent No.: US 11,505,120 B2
(45) Date of Patent: Nov. 22, 2022

(54) FRUNK LIGHTING SYSTEM WITH VARIABLE LIGHTING POSITION AND VEHICLE HAVING THE SAME

(71) Applicants: Hyundai Motor Company, Seoul (KR); Kia Corporation, Seoul (KR)

(72) Inventors: Yu-Sang Park, Seoul (KR); Eun-Soo Park, Usan (KR); Seung-Mok Lee, Gyeonggi-do (KR); Geun-Hyung Nam, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/354,344

(22) Filed: Jun. 22, 2021

(65) Prior Publication Data
US 2022/0242308 A1    Aug. 4, 2022

(30) Foreign Application Priority Data

Feb. 1, 2021    (KR) ......................... 10-2021-0013974

(51) Int. Cl.
| | |
|---|---|
| *B60Q 3/30* | (2017.01) |
| *B60Q 1/28* | (2006.01) |
| *F21S 43/31* | (2018.01) |
| *B60Q 3/57* | (2017.01) |
| *F21S 43/14* | (2018.01) |
| *B60Q 1/26* | (2006.01) |

(52) U.S. Cl.
CPC ............. *B60Q 3/30* (2017.02); *B60Q 1/2692* (2013.01); *B60Q 1/28* (2013.01); *B60Q 3/57* (2017.02); *F21S 43/14* (2018.01); *F21S 43/31* (2018.01)

(58) Field of Classification Search
CPC .......... B60Q 3/30; B60Q 1/2692; F21V 14/02
See application file for complete search history.

(56) References Cited

U.S. PATENT DOCUMENTS 9,964,293 B2 * 5/2018 Devlin .................... F21V 21/30

FOREIGN PATENT DOCUMENTS

| KR | 2011-0041358 A | 4/2011 |
| KR | 101527588 B1 * | 6/2015 |

* cited by examiner

*Primary Examiner* — Robert J May
(74) *Attorney, Agent, or Firm* — Fox Rothschild LLP

(57) ABSTRACT

A frunk lighting system applied to a vehicle is mounted on a hood provided with an emblem on a front of the vehicle to cover or open a space of a frunk, and has an illuminating direction of light emitted by a light source changed into lighting for the emblem and lighting for the frunk by movement of a rotating mechanism connected to a motor whose rotating direction is changed by a closing signal and an opening signal of the hood, thereby easily implementing an appearance design suitable for a future motorized vehicle with a light-emitting effect for the front emblem of the vehicle, and particularly, automatically switches the lighting, which has illuminated the emblem in a state where the hood is closed, toward the frunk to illuminate a frunk space, thereby maximizing visibility and usability of the frunk.

18 Claims, 5 Drawing Sheets

FRUNK LIGHTING SYSTEM WITH VARIABLE LIGHTING POSITION AND VEHICLE HAVING THE SAME

CROSS-REFERENCE TO RELATED APPLICATION

This application claims under 35 U.S.C. § 119(a) the benefit of Korean Patent Application No. 10-2021-0013974, filed on Feb. 1, 2021, the entire contents of which are incorporated herein by reference.

BACKGROUND

(a) Technical Field

The present disclosure relates to a frunk lighting system, more particularly, to a vehicle having the frunk lighting system with a variable lighting position for generating a lighting effect for a frunk together with a light-emitting effect for a front emblem in connection with opening/closing of a hood.

(b) Description of the Related Art

A future motorized vehicle may utilize a front engine room space as a frunk for storage and needs lighting for obtaining visibility due to the absence of an engine. For example, an electric vehicle (EV) does not require the engine, and thus the front engine room space may be used for storage and the like.

Particularly, for the future motorized vehicle, the formation of additional aesthetic elements (e.g., for exterior parts) is considered as an important topic for a future-oriented design.

As an example, an emblem, which is the mark of an automobile manufacturer, is an exterior part positioned on the front of the vehicle using a hood, and may form additional aesthetic elements with a light-emitting effect for the emblem or the like, thereby implementing a future-oriented design suitable for the future motorized vehicle.

However, a hood in a current vehicle or an EV model vehicle is only a functional part of being simply opened and closed, and typically does not include additional aesthetic elements such as an emblem.

Therefore, there is the need for developing a hood lighting system capable of generating a light-emitting effect for the emblem and illuminating the frunk from the hood of the current vehicle or the EV model vehicle, and implementing the future-oriented design suitable for the future motorized vehicle using the hood lighting system. As used herein, the frunk is also called a front trunk, and refers to a loading space in which an engine room of a typical internal combustion engine vehicle is used as a free space due to non-application of the engine, which is an advantage of the EV.

The contents described in Description of Related Art are to help the understanding of the background of the present disclosure, and may include what is not previously known to those skilled in the art to which the present disclosure pertains.

SUMMARY

Therefore, an object of the present disclosure is to provide a frunk lighting system with a variable lighting position and a vehicle having the same, which may make a front emblem shine with a light-emitting effect in a state where a hood is closed, thereby implementing a front appearance design of a vehicle suitable for a future motorized vehicle, and particularly, automatically switch the lighting, which has illuminated the emblem in the state where the hood is closed, toward a frunk when the hood is open to illuminate a frunk space, thereby maximizing visibility and usability for the frunk.

A frunk lighting system according to the present disclosure for achieving the object includes a motor for receiving a driving signal for changing a rotating direction between a forward rotation and a reverse rotation, a rotating mechanism connected to the motor, and a lamp coupled to the rotating mechanism, and having an illuminating direction of the light emitted by a light source changed according to a change in a rotating direction of the motor between the forward rotation and the reverse rotation.

As a preferred exemplary embodiment, the driving signal is classified into a hood closing signal of a hood for the forward rotation and a hood opening signal of the hood for the reverse rotation, and the change in the illuminating direction is lighting for an emblem provided on the front of the hood and lighting for a space of a frunk covered by the hood.

As the preferred exemplary embodiment, the rotating mechanism is composed of a driving shaft connected to a motor shaft of the motor, a driven shaft spaced apart from a bottom side of the driving shaft and mounted with the lamp, and a rotating gear connecting between the driving shaft and the driven shaft to deliver the rotation of the driving shaft to the driven shaft.

As the preferred exemplary embodiment, the rotating gear is composed of a driving gear fixed to the driving shaft to be rotated together with the driving shaft, and a driven gear fixed to the driven shaft to rotate the driven shaft, and the driving gear and the driven gear are engaged with each other and rotated.

As the preferred exemplary embodiment, the driving gear is formed to have a diameter smaller than a diameter of the driven gear to have a diameter difference, and the driven gear forms a rotating angle of the driven gear at an acute angle due to the diameter difference.

As the preferred exemplary embodiment, the lamp is composed of a light source module having a light source, and rotated together with a driven shaft rotated by a driving shaft of the rotating mechanism connected to the motor, a reflector surrounding the light source module such that the light is fully reflected, and rotated together with the driven shaft, and a pressing block provided on the reflector, and contacting the driving shaft such that a rotating position of the reflector is maintained.

As the preferred exemplary embodiment, the light source is provided on the front and back of the light source module, and is configured as an LED.

As the preferred exemplary embodiment, the reflector is formed of a plurality of reflector pieces threaded by a reflector fixing ring and overlapped with each other, and both ends of the reflector fixing ring are fixed to the pressing block.

As the preferred exemplary embodiment, the pressing block is formed in a triangular cross-sectional structure, and the triangular cross section contacts the driving shaft in both left and right sections of a vertex at the rotating position of the reflector.

As the preferred exemplary embodiment, the motor and the rotating mechanism are accommodated in an inner space of a cover bracket, and the cover bracket is mounted on a hood which generates the driving signal by closing and opening.

As the preferred exemplary embodiment, the motor is mounted on a motor fixing plate on one side portion of the inner space, and the rotating mechanism is coupled to a wall surface of the inner space and rotated.

Further, a vehicle according to the present disclosure for achieving the object includes a hood provided with an emblem on the front of the hood, the hood configured to be opened and closed to cover or open a space of a frunk; and a frunk lighting system having an illuminating direction of the light emitted by a light source changed into lighting for the emblem and lighting for the frunk by the movement of a rotating mechanism connected to a motor whose rotating direction is changed by a closing signal and an opening signal of the hood.

As a preferred exemplary embodiment, the hood is composed of a double panel of a hood outer panel and a hood inner panel, and the frunk lighting system is positioned in a space formed by the hood outer panel and the hood inner panel and fixed to the hood inner panel.

As the preferred exemplary embodiment, the frunk lighting system is provided with a cover bracket in which the motor, the rotating mechanism, and the light source are accommodated in an inner space of the frunk lighting system, and the cover bracket is fixed to the hood inner panel by a bolt or a screw.

As the preferred exemplary embodiment, the frunk lighting system is connected to a switching controller, the switching controller rotates the motor forward by the closing signal such that the illuminating direction heads to the emblem in a state where the hood is closed, and reversely rotates the motor by the opening signal such that the illuminating direction heads to the frunk in a state where the hood is opened.

As the preferred exemplary embodiment, the frunk lighting system is connected to a battery, and the motor and the light source receive power from the battery.

The frunk lighting system with the variable lighting position applied to the vehicle according to the present disclosure provides the following operations and effects.

First, the present disclosure is suitable for implementing the appearance design for the motorized vehicle by making the emblem, which is positioned on the hood in the front of the vehicle, shine with the light-emitting effect. Second, it is possible to implement the identity of the manufacturer as well as improving the degree of freedom of the design by illuminating the emblem. Third, it is possible to easily obtain the night visibility for the frunk and the engine room by automatically changing the lighting position of the light source from the emblem toward the frunk in connection with the opening of the hood. Fourth, it is possible to greatly improve the usability of the frunk by effectively illuminating the frunk of the EV model vehicle which is currently mass-produced. Fifth, it is possible to save the cost required for obtaining the lighting effect by unifying the lighting for the emblem and the lighting for the frunk. Sixth, the present disclosure is suitable for implementing the appearance design of the future motorized vehicle and may implement various expandability for the lighting for the vehicle later.

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an exemplary embodiment of the present disclosure will be described in detail with reference to accompanying exemplary drawings, and the exemplary embodiment is illustrative and may be implemented by those skilled in the art to which the present disclosure pertains in various different forms, and thus is not limited to the exemplary embodiment described herein.

Figure 1:
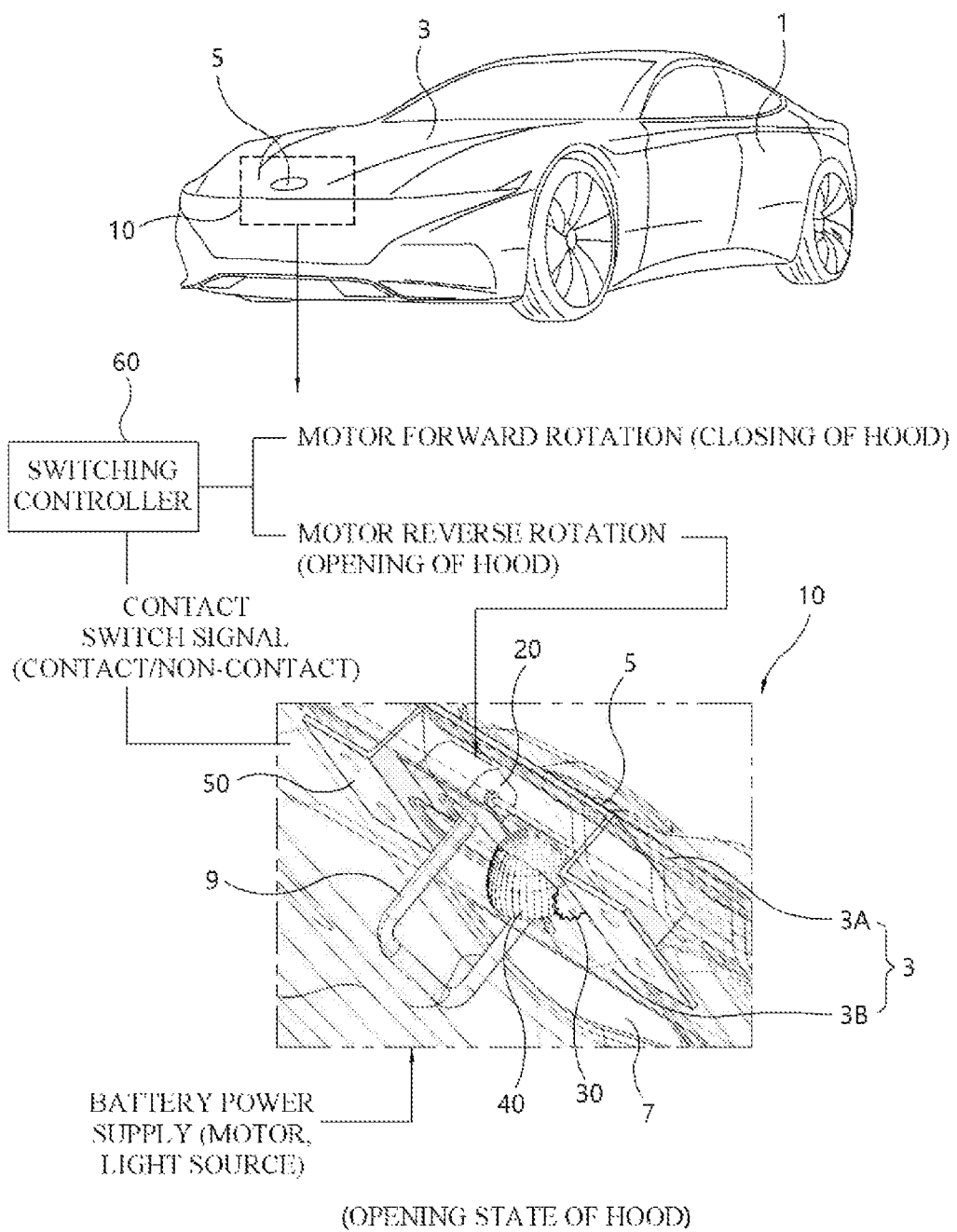
FIG. 1 is a diagram illustrating a configuration of a frunk lighting system applied to a vehicle according to the present disclosure.

Referring to FIG. 1, a vehicle 1 is provided with a frunk lighting system 10 on a hood 3. In this case, the vehicle 1 is an electric vehicle (EV) in which an engine room typically provided in a conventional internal combustion engine vehicle is used as a frunk 7 due to non-application of an engine and a future motorized vehicle including the same.

Specifically, the frunk lighting system 10 is composed of a motor 20, a rotating mechanism 30, a lamp 40, and a cover bracket 50. In this case, the motor 20 and the lamp 40 receive power from a battery, and the battery may be a vehicle battery or a separate battery.

As an example, the motor 20 is fixed to the cover bracket 50 to supply power to the rotating mechanism 30, and may use a step motor as an electric motor. The rotating mechanism 30 is connected to a motor shaft of the motor 20 to receive a rotating force, and is angularly moved by the rotating force, such that the lighting light having illuminated the emblem 5 in a state where the hood 3 is closed illuminates the frunk 7 in a state where the hood 3 is opened.

Therefore, the motor 20 and the rotating mechanism 30 are operated by an actuator for moving the lamp 40 such that the lighting light of the lamp 40 may effectively illuminate the emblem 5 and the frunk 7.

As an example, the lamp 40 is mounted on the rotating mechanism 30 to be angularly moved by the rotating force of the rotating mechanism 30 such that the illuminating direction of the lighting heads to the emblem 5 when the hood 3 is closed whereas the illuminating direction thereof heads to the frunk 7 when the hood 3 is opened.

As an example, the cover bracket 50 is fixed to the hood 3 to be moved together with the hood 3, and the motor 20 and the rotating mechanism 30 form a space in which the lamp 40 and the like are accommodated in an inner portion of the hood 3. In this case, the cover bracket 50 may be fixed to the hood 3 through a bolt or a screw or fixed to the hood 3 by welding.

To this end, the hood 3 is composed of a double panel of a hood outer panel 3A and a hood inner panel 3B and formed in a size of covering the entire space of the frunk 7. Particularly, the hood outer panel 3A is attached with the emblem 5 to provide a place exposed to the outside, and the hood inner panel 3B is attached to the inside of the hood outer panel 3A to fasten both left and right portions of the cover bracket 50. In this case, the hood inner panel 3B is provided with a hood striker 9 connected to a latch (not illustrated) serving to open and close the hood 3.

Therefore, the cover bracket 50 is positioned in a space formed by the hood outer panel 3A and the hood inner panel 3B, thereby preventing an assembly of the motor 20, the rotating mechanism 30, the lamp 40, and the cover bracket 50 accommodated in the space of the cover bracket 50 from being exposed to the outside from the hood 3.

As described above, the frunk lighting system 10 is characterized by a frunk lighting system in which the lamp 40 has the movement of the angular motion in combination with the motor 20 and the rotating mechanism 30, such that the lighting light of the lamp 40 selectively illuminates the emblem 5 and the frunk 7 according to the opening and closing of the hood 3.

Further, the frunk lighting system 10 may include a switching controller 60. This is because the switching controller 60 drives the motor 20 by a contact switch signal which detects the opening and closing of the hood 3 as contact (e.g., the closing of the hood) and non-contact (e.g., the opening of the hood), and the motor 20 may perform a motor forward rotation by using a contact switch contact signal as the closing of the hood 3 whereas the motor 20 may perform a motor reverse rotation by using a contact switch non-contact signal as the opening of the hood 3. In this case, the contact switch signal may be conversely set for the motor forward rotation and reverse rotation.

However, if the motor 20 is electrically connected to directly receive the contact switch contact signal of the motor forward rotation (e.g., the closing of the hood) and the contact switch non-contact signal of the motor reverse rotation (e.g., the opening of the hood), the switching controller 60 is not applicable.

Figure 2:
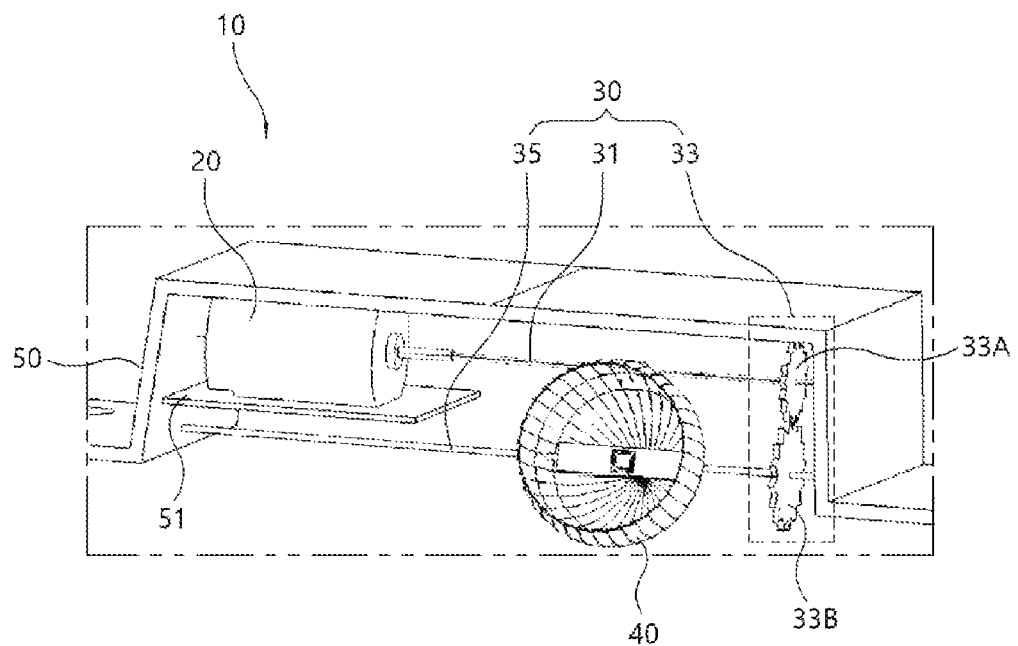
FIG. 2 is a diagram illustrating a detailed configuration of the frunk lighting system according to the present disclosure.
Figure 3:
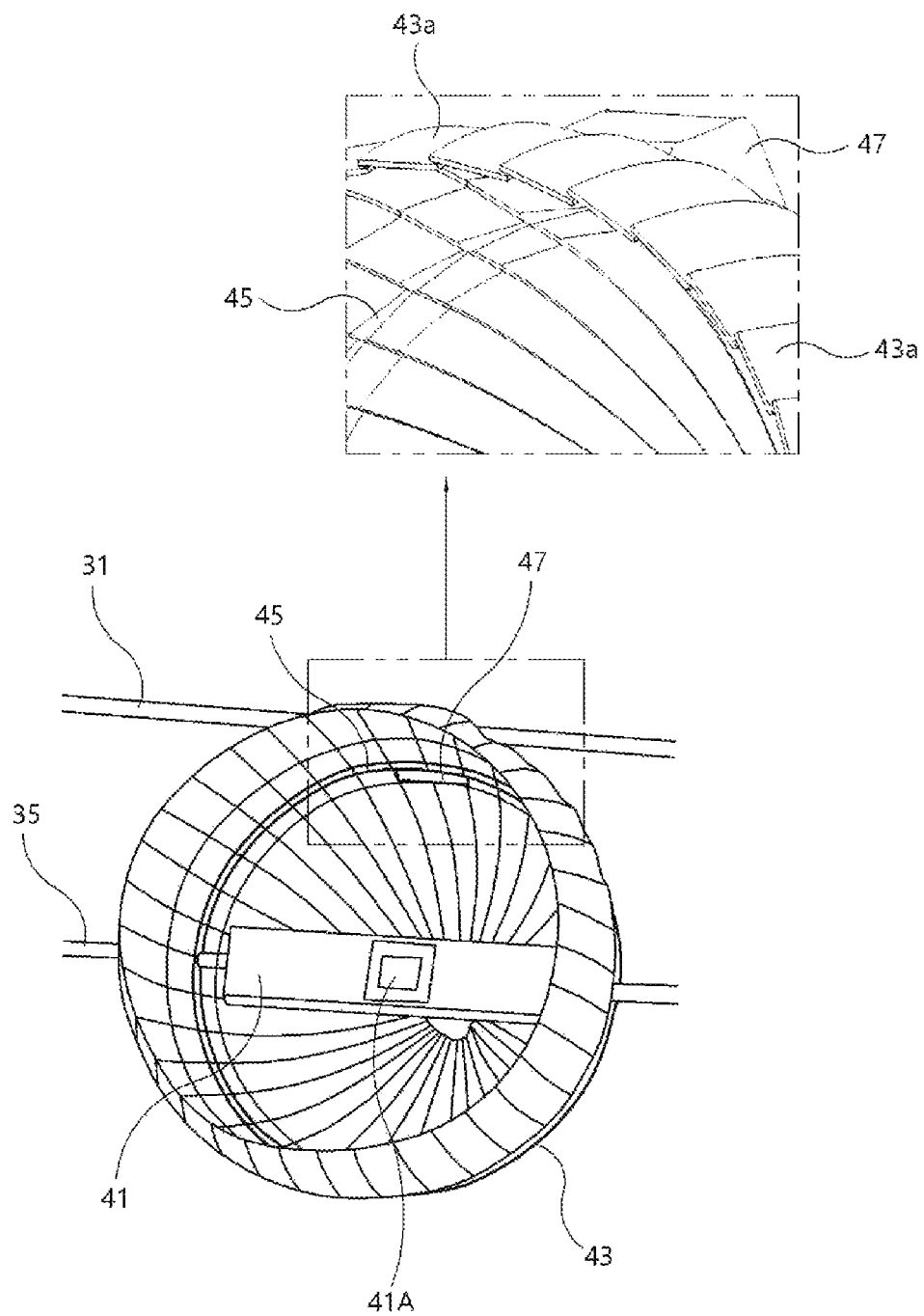
FIG. 3 is a diagram illustrating a detailed configuration of a reflector structural lamp according to the present disclosure.

Meanwhile, FIGS. 2 and 3 illustrate a detailed configuration and assembling relationship for the motor 20, the rotating mechanism 30, the lamp 40, and the cover bracket 50 of the frunk lighting system 10.

Referring to FIG. 2, the cover bracket 50 is formed of a square hat-shaped body ( ⌐ ⌐ ) having a fastening flange with holes in both left and right sides, and accommodates the motor 20, the rotating mechanism 30, and the lamp 40 in an inner space of the square hat-shaped body.

Particularly, the cover bracket 50 is provided with a motor fixing plate 51, and the motor fixing plate 51 protrudes from one side of the square hat-shaped body to the inner space to form a predetermined interval with an upper surface of the square hat-shaped body.

Therefore, the layouts and detailed configurations of the motor 20, the rotating mechanism 30, and the lamp 40 accommodated in the inner space of the cover bracket 50 are as follows.

As an example, the motor 20 is fixed to the motor fixing plate 51 of the cover bracket 50 by welding or fastened to the motor fixing plate 51 of the cover bracket 50 by a bolt or a screw to be positioned on one side portion of the cover bracket 50 and electrically connected to the battery and/or the switching controller 60 by a wire harness.

Specifically, the rotating mechanism 30 is composed of a driving shaft 31, a rotating gear 33, and a driven shaft 35, and connected to the motor shaft of the motor 20 to receive a rotating force to move the lamp 40.

As an example, the driving shaft 31 is connected to the motor shaft of the motor 20, and crosses the inner space of the cover bracket 50 to be positioned at the side opposite to the motor 20. The driven shaft 35 is mounted with the lamp 40 in a predetermined section, and crosses the inner space of the cover bracket 50 under the driving shaft 31 to be positioned under the motor 20 at the motor 20 side. The rotating gear 33 is composed of a driving gear 33A fixed to the driving shaft 31 to be rotated together with the driving shaft 31, and a driven gear 33B fixed to the driven shaft 35 to rotate the driven shaft 35, and delivers the rotation of the driven shaft 35 to the driven shaft 35 to form the rotating direction of the driving shaft 31 and the rotating direction of the driven shaft 35 in the opposite directions.

Particularly, the driving shaft 31 has the other side coupled to an inner wall of the cover bracket 50 in a rotatable free end structure at the opposite side of the motor 20 in a state where one side is connected to the motor 20, and the driven shaft 35 has both left and right sides coupled to the inner wall of the cover bracket 50 in a rotatable free end structure to enable the rotation of the driven gear 33B. Therefore, the end of the shaft may be supported by a bearing in the free end structures of the driving shaft 31 and the driven shaft 35.

Further, the driving gear 33A and the driven gear 33B of the rotating gear 33 are engaged with each other, such that the driven gear 33B is rotated by the driving gear 33A. In this case, the driving gear 33A is formed to have a diameter (d) smaller than a diameter (D) of the driven gear 33B, and a rotating amount of the driven gear 33B is formed to be smaller than a rotating amount of the driving gear 33A through a diameter ratio (d/D) thereof.

Therefore, the driven gear 33B is rotated by only a predetermined angle when the driving gear 33A is rotated several times, such that the movement of the lamp 40 is also angularly moved by only the predetermined angle. In this case, the predetermined angle is formed as an acute angle within 45° to 90° corresponding to a vertical position of the lamp 40 heading to the frunk 7 from a horizontal position of the lamp 40 heading to the emblem 5.

As an example, the lamp 40 is fixed to the driven shaft 35 to be rotated together with the driven shaft 35.

Referring to FIG. 3, the lamp 40 is composed of a light source module 41, a reflector 43, and a pressing block 47.

As an example, the light source module 41 is formed in a rectangular plate shape and provided with a light source 41A in a middle section thereof, and the light source 41A is electrically connected to the battery to receive power when a vehicle is started.

Particularly, the light source module 41 may be fixed to the driven shaft 35 by welding or coupled and fixed to the driven shaft 35 in a fitting structure by a clip. Further, one light source 41A may be provided on each of the front and back of the light source module 41 or the light source 41A may be provided in a plurality of columns on the front and back thereof, and may use a bulb or a light emitting diode (LED).

As an example, the reflector 43 is formed in a structure of surrounding the light source module 41 in a state of being positioned at the center of the reflector 43 with a rice bowl shape in which a plurality of reflector pieces 43a, which are metallic plates, are threaded by a reflector fixing ring 45 and overlapped with each other, and formed in a lame steamer structure in which the diameter may be contracted and expanded by an operation in which the entire reflector 43 is moved with respect to the center at which the light source module 41 is positioned even if only one place of the reflector 43 is pressed, and thus shrunk and widened back and forth.

Particularly, the reflector 43 is fixed by making holes in two reflector pieces 43a facing each other at 180° among the plurality of reflector pieces 43a to penetrate the driven shaft 35 therethrough, such that the reflector 43 is also rotated together with the rotation of the driven shaft 35.

As an example, the pressing block 47 is formed of a block of about triangular cross-sectional structure in which both ends of the reflector fixing ring 45 are fixed, such that the reflector 43 maintains a shrunk form. In this case, the pressing block 47 is provided in a state of being exposed to the outside of the reflector 43 and divided into a front section and a back section of the reflector with respect to a vertex of the triangular cross section.

Figure 4:
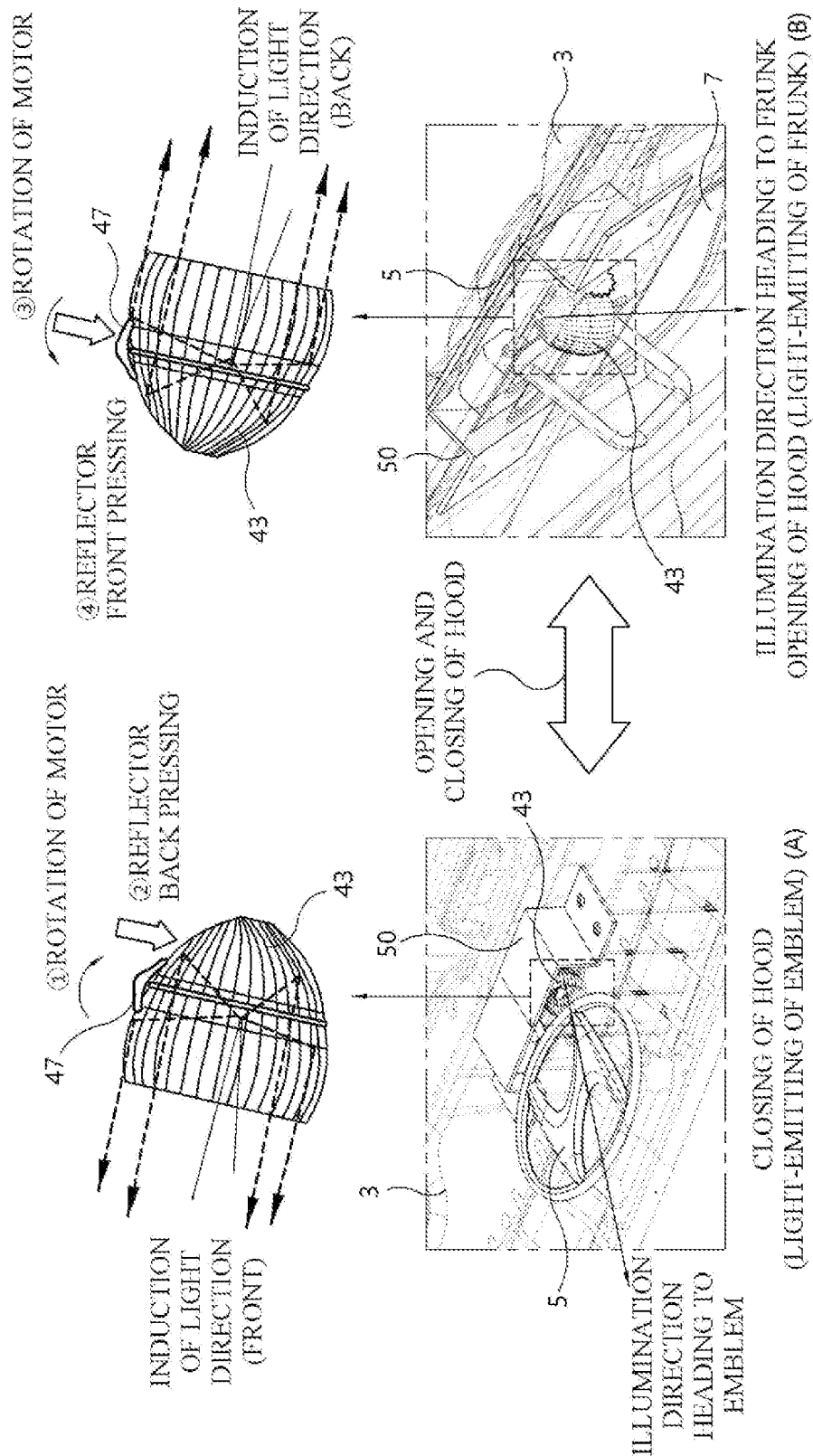
FIG. 4 is a diagram illustrating an operating state where the frunk lighting system illuminates each of an emblem and a frunk using a reflector when a hood of the vehicle according to the present disclosure is opened and closed.
Figure 5:
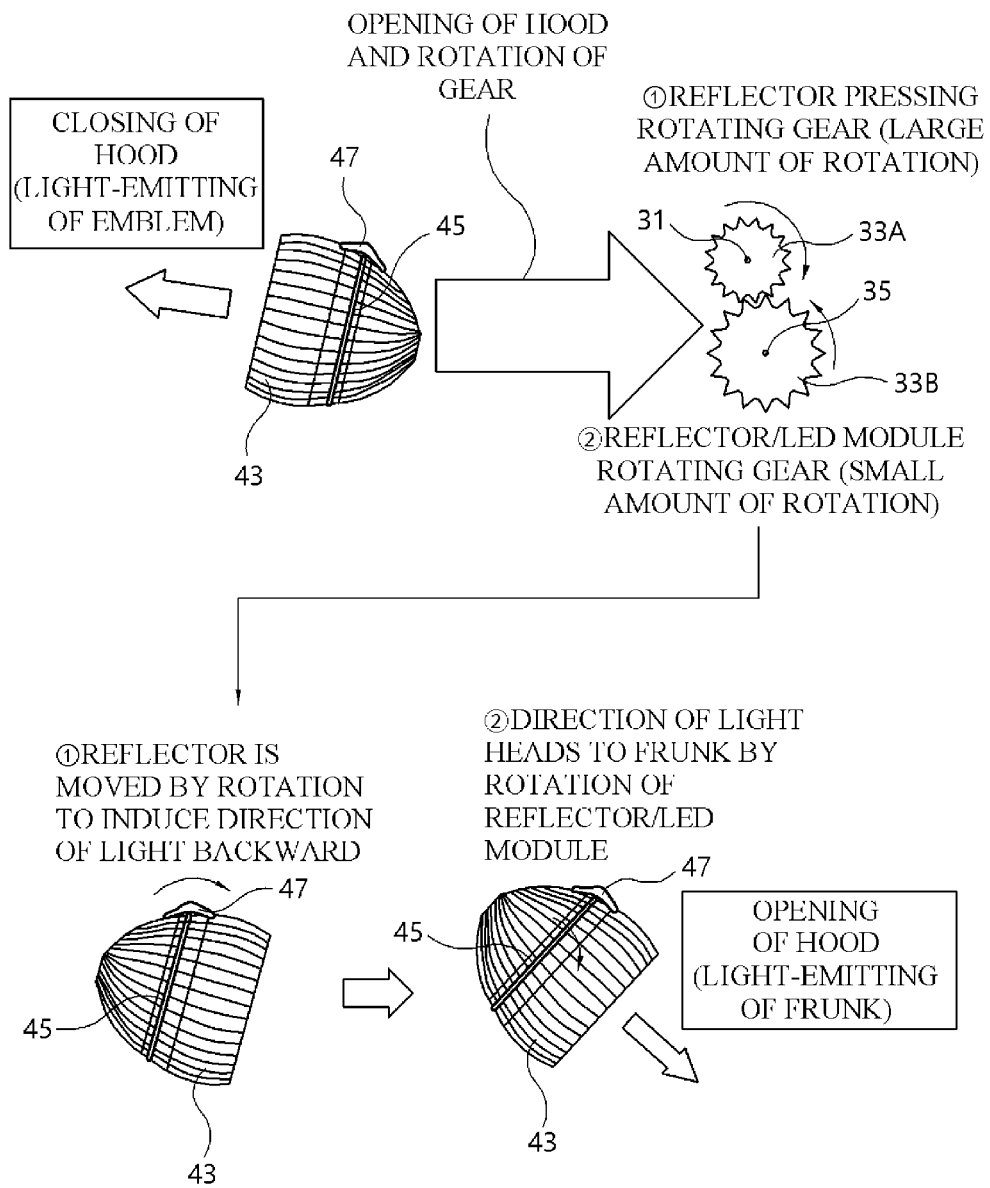
FIG. 5 is a diagram illustrating a lighting position change state through the reflector of the lamp when the hood according to the present disclosure is closed and opened.

Meanwhile, FIGS. 4 and 5 illustrate that the frunk lighting system 10 may effectively implement the lighting for each of the emblem 5 and the frunk 7 by switching the direction of the reflector 43 when the hood 3 of the vehicle 1 is opened and closed.

Referring to an emblem light-emitting state (A) when the hood is closed in FIG. 4, for the closing of the hood 3, the driven shaft 35 of the driven gear 33B engaged with the driving gear 33A of the driving shaft 31 is rotated in a rotating state (①) of the motor 20 by the motor forward rotation signal (see FIG. 1) of the switching controller 60, such that the reflector 43 is switched to a state of moving upward by the rotating angle of the driven shaft 35.

Then, the reflector 43 is characterized in that the back section of the reflector of the triangular cross-sectional vertex of the pressing block 47 is switched to a reflector back pressing state (②) due to the contact with the driving shaft 31, and the light emitted by the light source 41A of the light source module 41 is fully reflected from the inside of the reflector 43 to head to the emblem 5, such that the emblem 5 shines. In this case, the reflector back pressing state (②) operates such that the reflector 43 may maintain the direction heading to the emblem 5.

On the other hand, referring to a frunk light-emitting state (B) when the hood is opened in FIG. 4, for the opening of the hood 3, the driven shaft 35 of the driven gear 33B engaged with the driving gear 33A of the driving shaft 31 is rotated in a rotating state (③) of the motor 20 due to the motor reverse rotation signal (see FIG. 1) of the switching controller 60, such that the reflector 43 is switched to a state of moving downward by the rotating angle of the driven shaft 35.

Then, the reflector 43 is characterized in that the front section of the reflector of the triangular cross-sectional vertex of the pressing block 47 is switched to a reflector front pressing state (④) due to the contact with the driving shaft 31, and the light emitted by the light source 41A of the light source module 41 is fully reflected from the inside of the reflector 43 to head to the frunk 7, such that the space of the frunk 7 shines by the lighting. In this case, the reflector front pressing state (④) operates such that the reflector 43 may maintain the direction of heading to the space of the frunk 7.

FIG. 5 illustrates an operating state of the rotating mechanism 30 for switching the reflector 43 from the emblem light-emitting state (A) to the frunk light-emitting state (B) illustrated in FIG. 4 as the hood 3 is switched from the closed state to the opened state. In this case, the driving gear 33A of the rotating mechanism 30 is operated as a reflector pressing rotating gear rotated by the driving shaft 31 pressing the pressing block 47, and the driven gear 33B is operated as a reflector/LED module rotating gear for rotating the driven shaft 31 such that the light source module 41 and the reflector 43 are moved (i.e., angularly moved).

As illustrated, the light of the light source 41A illuminates the emblem 5 through the reflector 43 inclined upward in the state where the hood is closed and then the driving gear 33A of the rotating mechanism 30 receives the rotating force of the motor 20 through the driving shaft 31 in the state where the hood is opened. In this case, the lighting illuminating state of the reflector 43 is considered as the state where the movement of the reflector 43 is expressed in the direction opposite to the direction illustrated in FIG. 2.

Then, the driven gear 33B is engaged with the driving gear 33A and rotated, such that the driven shaft 35 is rotated. As a result, the driven shaft 35 moves the reflector 43 by rotation to induce the opening direction of the reflector 43 backward (①) and at the same time, also moves the light source module 41 together with the reflector 43 to induce the direction of the light source module 41 (②) such that the direction of the light of the light source 41A heads to the frunk 7, such that the inner space of the frunk 7 may shine by the light of the light source 41A according to the opening of the hood.

Meanwhile, if the hood 3 is switched from the opened state back to the closed state, only the directions of the rotation of the motor 20 and the rotation of the driving shaft 31, the driving gear 33A, the driven gear 33B, and the driven shaft 35 are opposite, such that a detailed description thereof will be omitted.

As described above, the frunk lighting system 10 applied to the vehicle 1 according to the present exemplary embodiment may be mounted on the hood 3 provided with the emblem 5 on the front to cover or open the space of the frunk 7, and may have the illuminating direction of the light emitted by the light source 41A changed into the lighting for the emblem 5 and the lighting for the frunk 7 by the movement of the rotating mechanism 30 connected to the motor 20 whose rotating direction is changed by the closing signal and opening signal of the hood 3, thereby easily implementing the appearance design suitable for the future motorized vehicle with the light-emitting effect for the front emblem 5 of the vehicle, and particularly, may automatically switch the lighting, which has illuminated the emblem 5 in the state where the hood 3 is closed, toward the frunk 7 to illuminate the frunk space, thereby maximizing visibility and usability for the frunk.

What is claimed is:

1. A frunk lighting system, comprising:
   a motor for receiving a driving signal for changing a rotating direction between a forward rotation and a reverse rotation;
   a rotating mechanism connected to the motor; and
   a lamp coupled to the rotating mechanism, and having an illuminating direction of the light emitted by a light source changed according to a change in the rotating direction of the motor between the forward rotation and the reverse rotation,
   wherein the motor and the rotating mechanism are accommodated in an inner space of a cover bracket, and
   wherein the cover bracket is mounted on a hood which generates the driving signal by closing and opening.

2. The frunk lighting system of claim 1,
   wherein the driving signal is classified into a hood closing signal of a hood for the forward rotation and a hood opening signal of the hood for the reverse rotation, and
   wherein the illuminating direction changes between lighting for an emblem provided on the front of the hood and lighting for a space of a frunk covered by the hood.

3. The frunk lighting system of claim 1, wherein the rotating mechanism is composed of:
   a driving shaft connected to a motor shaft of the motor;
   a driven shaft spaced apart from a bottom side of the driving shaft and mounted with the lamp; and
   a rotating gear connecting between the driving shaft and the driven shaft to deliver rotation of the driving shaft to the driven shaft.

4. The frunk lighting system of claim 3, wherein the rotating gear is composed of:
   a driving gear fixed to the driving shaft to be rotated together with the driving shaft; and
   a driven gear fixed to the driven shaft to rotate the driven shaft.

5. The frunk lighting system of claim 4, wherein the driving gear and the driven gear are engaged with each other and rotated.

6. The frunk lighting system of claim 4,
   wherein the driving gear is formed to have a diameter smaller than a diameter of the driven gear to have a diameter difference, and
   wherein the driven gear forms a rotating angle of the driven gear at an acute angle due to the diameter difference.

7. The frunk lighting system of claim 1, wherein the lamp is composed of:
   a light source module having a light source, and rotated together with a driven shaft rotated by a driving shaft of the rotating mechanism connected to the motor;
   a reflector surrounding the light source module such that the light is fully reflected, and rotated together with the driven shaft; and
   a pressing block provided on the reflector, and contacting the driving shaft such that a rotating position of the reflector is maintained.

8. The frunk lighting system of claim 7, wherein the light source is provided on the front and back of the light source module.

9. The frunk lighting system of claim 8, wherein the light source is a light emitting diode (LED).

10. The frunk lighting system of claim 7,
    wherein the reflector is formed of a plurality of reflector pieces threaded by a reflector fixing ring and overlapped with each other, and
    wherein both ends of the reflector fixing ring are fixed to the pressing block.

11. The frunk lighting system of claim 7,
    wherein the pressing block is formed in a triangular cross-sectional structure, and
    wherein the triangular cross section contacts the driving shaft in both left and right sections of a vertex at the rotating position of the reflector.

12. The frunk lighting system of claim 1,
    wherein the motor is mounted on a motor fixing plate on one side portion of the inner space, and
    wherein the rotating mechanism is coupled to a wall surface of the inner space and rotated.

13. A vehicle comprising:
    a hood provided with an emblem on a front of the hood, the hood configured to be opened and closed to cover or open a space of a frunk; and
    a frunk lighting system mounted on the hood, and having an illuminating direction of the light emitted by a light source changed into lighting for the emblem and lighting for the frunk by the movement of a rotating mechanism connected to a motor whose rotating direction is reversed by a closing signal and an opening signal of the hood.

14. The vehicle of claim 13,
    wherein the hood is composed of a double panel of a hood outer panel and a hood inner panel, and
    wherein the frunk lighting system is positioned in a space formed by the hood outer panel and the hood inner panel and fixed to the hood inner panel.

15. The vehicle of claim 14,
    wherein the frunk lighting system is provided with a cover bracket in which the motor, the rotating mechanism, and the light source are accommodated in an inner space of the frunk lighting system, and
    wherein the cover bracket is fixed to the hood inner panel by a bolt or a screw.

16. The vehicle of claim 13,
    wherein the frunk lighting system is connected to a switching controller,
    wherein the switching controller rotates the motor forward by the closing signal such that the illuminating direction heads to the emblem in a state where the hood is closed, and
    reversely rotates the motor by the opening signal such that the illuminating direction heads to the frunk in a state where the hood is opened.

17. The vehicle of claim 13,
wherein the frunk lighting system is connected to a battery, and
wherein the motor and the light source receive power from the battery.

18. A frunk lighting system, comprising:
a motor for receiving a driving signal for changing a rotating direction between a forward rotation and a reverse rotation;
a rotating mechanism connected to the motor; and
a lamp coupled to the rotating mechanism, and having an illuminating direction of the light emitted by a light source changed according to a change in the rotating direction of the motor between the forward rotation and the reverse rotation,
wherein the lamp comprises:
a light source module having a light source, and rotated together with a driven shaft rotated by a driving shaft of the rotating mechanism connected to the motor;
a reflector surrounding the light source module such that the light is fully reflected, and rotated together with the driven shaft; and
a pressing block provided on the reflector, and contacting the driving shaft such that a rotating position of the reflector is maintained, and
wherein the light source is provided on the front and back of the light source module.

* * * * *